(12) United States Patent
Pettey

(10) Patent No.: US 8,816,553 B2
(45) Date of Patent: Aug. 26, 2014

(54) HOBBY SERVO BLOCKS FOR USE WITH HOBBY SERVO MOTORS

(75) Inventor: Brian T. Pettey, Winfield, KS (US)

(73) Assignee: Robotzone, LLC, Winfield, KS (US)

( * ) Notice: Subject to any disclaimer, the term of this patent is extended or adjusted under 35 U.S.C. 154(b) by 211 days.

(21) Appl. No.: 13/593,724

(22) Filed: Aug. 24, 2012

(65) Prior Publication Data
US 2013/0099614 A1      Apr. 25, 2013

Related U.S. Application Data

(60) Provisional application No. 61/550,624, filed on Oct. 24, 2011.

(51) Int. Cl.
| | |
|---|---|
| *H02K 5/15* | (2006.01) |
| *H02K 7/08* | (2006.01) |
| *F16C 35/04* | (2006.01) |
| *H02K 7/14* | (2006.01) |
| *H02K 5/04* | (2006.01) |

(52) U.S. Cl.
CPC ............... *F16C 35/045* (2013.01); *H02K 7/14* (2013.01)
USPC ............................................. 310/91; 310/89

(58) Field of Classification Search
CPC ............. H02K 5/04; H02K 5/15; H02K 5/16; H02K 7/003; H02K 7/08
USPC ...................................................... 310/91, 89
See application file for complete search history.

(56) References Cited

U.S. PATENT DOCUMENTS

| | | | |
|---|---|---|---|
| 7,270,589 B1 * | 9/2007 | Brown et al. | ................. 446/317 |
| 7,285,884 B2 | 10/2007 | Pettey | |
| 7,336,009 B2 | 2/2008 | Pettey | |
| 7,501,731 B2 | 3/2009 | Pettey | |
| 7,559,129 B2 | 7/2009 | Pettey | |
| 7,671,497 B2 | 3/2010 | Pettey | |
| 7,750,517 B2 | 7/2010 | Pettey | |
| 7,795,768 B2 | 9/2010 | Pettey | |
| 7,859,151 B2 | 12/2010 | Pettey | |
| 7,891,902 B2 | 2/2011 | Pettey | |
| 7,934,691 B2 | 5/2011 | Pettey | |
| 2006/0003865 A1 * | 1/2006 | Pettey | ............................... 477/7 |
| 2009/0179129 A1 * | 7/2009 | Pettey | ......................... 248/278.1 |
| 2009/0247045 A1 | 10/2009 | Pettey | |
| 2011/0115344 A1 | 5/2011 | Pettey | |
| 2012/0139468 A1 | 6/2012 | Pettey | |
| 2012/0200510 A1 | 8/2012 | Pettey et al. | |

OTHER PUBLICATIONS

"Photo Higher Design History" received from a Third Party during licensing negotiations in Oct. 2012, 4 pages.

(Continued)

*Primary Examiner* — Michael Andrews
(74) *Attorney, Agent, or Firm* — Christopher L. Holt; Kelly, Holt & Christenson, PLLC

(57) ABSTRACT

Hobby servo blocks are provided. In certain circumstances, servo blocks may increase a servo's load-bearing capabilities by helping to isolate the lateral load from the servo spline and case. The extreme versatility of servo blocks allow users to create complex, extremely rigid, structures with ease using standard servos. The robust framework acts as a servo exoskeleton, greatly enhancing the mechanical loads the servo can withstand. Additionally, servo blocks may include a hub pattern that is repeated throughout the framework to allow endless attachment options.

20 Claims, 20 Drawing Sheets

(56) References Cited

OTHER PUBLICATIONS

"KAPER: Digital Photography E-Resources", What's New, Reverse chronology of additions or changes to KAPER, http://www.kaper.us/NewKAP_R.html, printed Nov. 20, 2012, 14 pages.

Printed from http://web.archive.org/web/200101262021/http:/www.seattlerobotics.org/encoder/200010/servohac.htm printed on Nov. 20, 2012, 1 page.

"RunRyder: Helicopters", Aerial Photography and Video: My Rig—cam mount, http://rc.runryder.com/helicopter/t47322p1/, printed Nov. 26, 2012, 7 pages.

"KAPER: Digital Photography E-Resources", Basics/Camera Cradle/360 Servo Conversions, Method 2—Geared External Pot, http://www.kaper.us/basics/BAS-360_2_R.html, printed Nov. 20, 2012, 2 pages.

"RunRyder: Helicopters", Aerial Photography and Video: My First Camera Mount, http://rc.runryder.com/helicopter/t55545p1/, printed Nov. 20, 2012, 1 page.

"RunRyder: Helicopters", Aerial Photography and Video: Front mount side frame contest, http://rc.runryder.com/helicopter/t144518p1/, printed Nov. 26, 2012, 6 pages.

"RunRyder: Helicopters", Aerial Photography and Video: My current camera mount, http://rc.runryder.com/helicopter/t135298p1/, printed Nov. 26, 2012, 5 pages.

"RunRyder: Helicopters", Aerial Photography and Video: My new camera mount development, http://rc.runryder.com/helicopter/t137031p1/, printed Nov. 26, 2012, 7 pages.

"RunRyder: Helicopters", Aerial Photography and Video: Injection moulded Camera Mount, http://rc.runryder.com/helicopter/t178271p1/, printed Nov. 20, 2012, 4 pages.

U.S. Appl. No. 13/655,883, filed Oct. 19, 2012, 22 pages.
U.S. Appl. No. 13/616,316, filed Sep. 14, 2012, 18 pages.
U.S. Appl. No. 13/221,477, filed Aug. 30, 2011, 55 pages.

\* cited by examiner

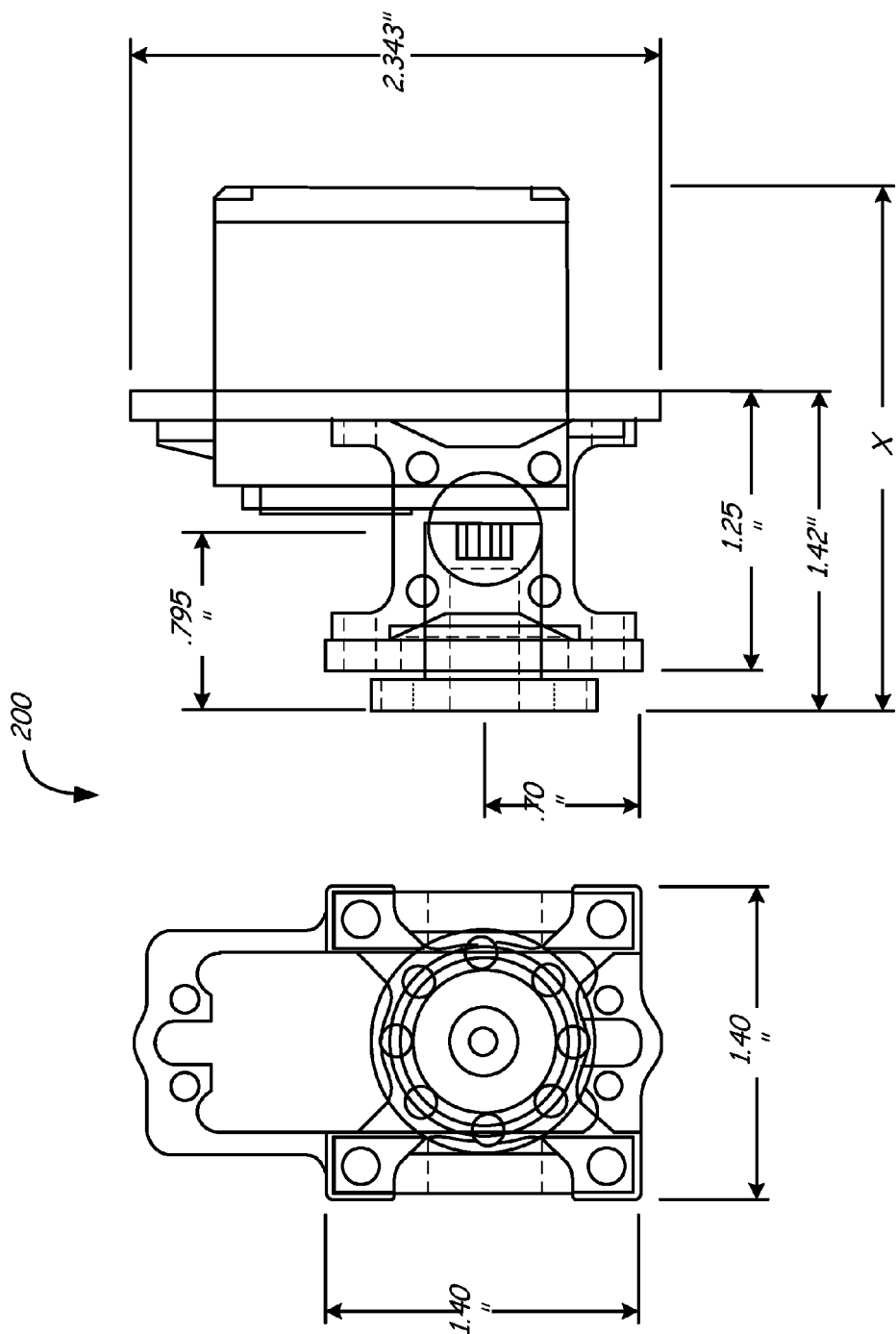

HOBBY SERVO BLOCKS FOR USE WITH HOBBY SERVO MOTORS

REFERENCE TO RELATED CASE

The present application claims the priority of provisional application Ser. No. 61/550,624 filed on Oct. 24, 2011, the content of which is hereby incorporated by reference in its entirety.

BACKGROUND

A servo motor (a.k.a. simply a "servo") is a device having a rotatable output shaft. The output shaft can typically be positioned to specific angular positions in accordance with a coded signal received by the servo. It is common that a particular angular position will be maintained as long as a corresponding coded signal exists on an input line. If the coded signal changes, the angular position of the shaft will change accordingly. Control circuits and a potentiometer are typically included within the servo motor casing and are functionally connected to the output shaft. Through the potentiometer (e.g., a variable resistor), the control circuitry is able to monitor the angle of the output shaft. If the shaft is at the correct angle, the motor actuates no further changes. If the shaft is not at the correct angle, the motor is actuated in an appropriate direction until the angle is correct.

There are different types of servos that include output shafts having varying rotational and torque capabilities. For example, the rotational and/or torque capability of an industrial servo is typically less restricted than that of a hobby servo. That being said, hobby servos are generally available commercially at a cost that is much less than that associated with industrial servos.

Because hobby servos are relatively small and inexpensive, they are popular within the hobby-mechanical industry for applications such as, but by no means limited to, hobby robotic applications and radio-controlled models (cars, planes, boats, etc.). One example of a hobby servo is the Futaba S-148 available from Futaba Corporation of America located in Schaumburg, Ill.

SUMMARY

An aspect of the disclosure relates to hobby servo blocks. In certain circumstances, servo blocks may increase a servo's load-bearing capabilities by helping to isolate the lateral load from the servo spline and case. The extreme versatility of servo blocks allow users to create complex, extremely rigid, structures with ease using standard servos. The robust framework acts as a servo exoskeleton, greatly enhancing the mechanical loads the servo can withstand. Additionally, servo blocks may include a hub pattern that is repeated throughout the framework to allow endless attachment options.

These and various other features and advantages that characterize the claimed embodiments will become apparent upon reading the following detailed description and upon reviewing the associated drawings.

BRIEF DESCRIPTION OF THE DRAWINGS

FIGS. 4-1 through 4-7 are perspective view of steps for assembling and attaching a servo block to a hobby servo motor.
FIG. 5 is a perspective view of a servo plate.
FIGS. 6-1 and 6-2 are perspective views of a ball baring plate.
FIGS. 7-1 and 7-2 are perspective views of a hub plate.
FIGS. 8-1 and 8-2 are perspective views of a servo spline shaft hub.
FIGS. 9-1 and 9-2 are perspective views of a tube clamping hub.
FIG. 10 is a plan drawing of some exemplary dimensions a servo block.

DETAILED DESCRIPTION

Embodiments of the present disclosure include hobby servo blocks. As mentioned in the Summary section, servo blocks may increase a servo's load-bearing capabilities by helping to isolate the lateral load from the servo spline and case. The extreme versatility of servo blocks allow users to create complex, extremely rigid, structures with ease using standard servos. The robust framework acts as a servo exoskeleton, greatly enhancing the mechanical loads the servo can withstand. Additionally, servo blocks may include a hub pattern that is repeated throughout the framework to allow endless attachment options.

Figure 1:
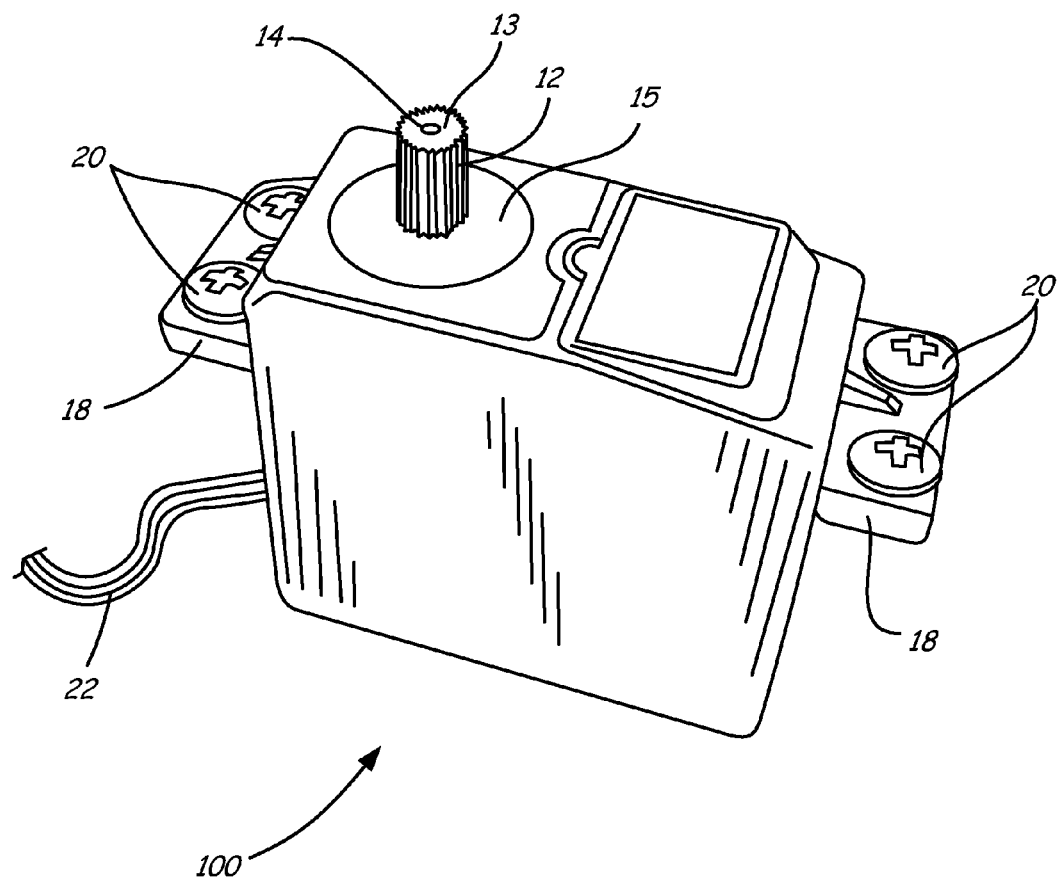
FIG. 1 is a perspective view of a hobby servo motor.

FIG. 1 is a perspective view of one example of a hobby servo motor 100. Certain embodiments described herein are intended for implementation in association with a motor such as, but not limited to, a hobby servo motor, or more simply stated, a hobby servo. Hobby servo 100 can be any type of hobby servo and is not limited in terms of its style, capacity, motor speed, or load carrying capability. Hobby servo 100 is not intended to suggest any limitation as to the scope of use or functionality of the claimed subject matter. Neither should hobby servo 100 be interpreted as having any dependency or requirement relating to any one or combination of illustrated components.

Hobby servo 100 includes a rotatable splined output shaft 12, rotatable splined shaft output top 13, threaded orifice 14, circular planar surface 15, a pair of flanges 18, mounting screws 20, and an electrical cable 22. Splined output shaft 12 has teeth (or ridges) distributed around the outside surface of the output shaft. This configuration is described as a "male" spline configuration. Standard configurations of hobby servos have 23, 24, or 25 teeth. Threaded orifice 14 extends into splined output shaft 12 and is adapted to receive an attachment screw (not shown). Flanges 18 are adapted to receive mounting screws 20. Flanges 18 and screws 20 are adapted to work in combination to mount hobby servo 100 in an operating environment. Electrical cable 22 is attached to the hobby servo 100 and provides electrical power and/or electrical signals to cause the output shaft 12 to rotate in a counter-clockwise or clockwise direction.

Figure 2:
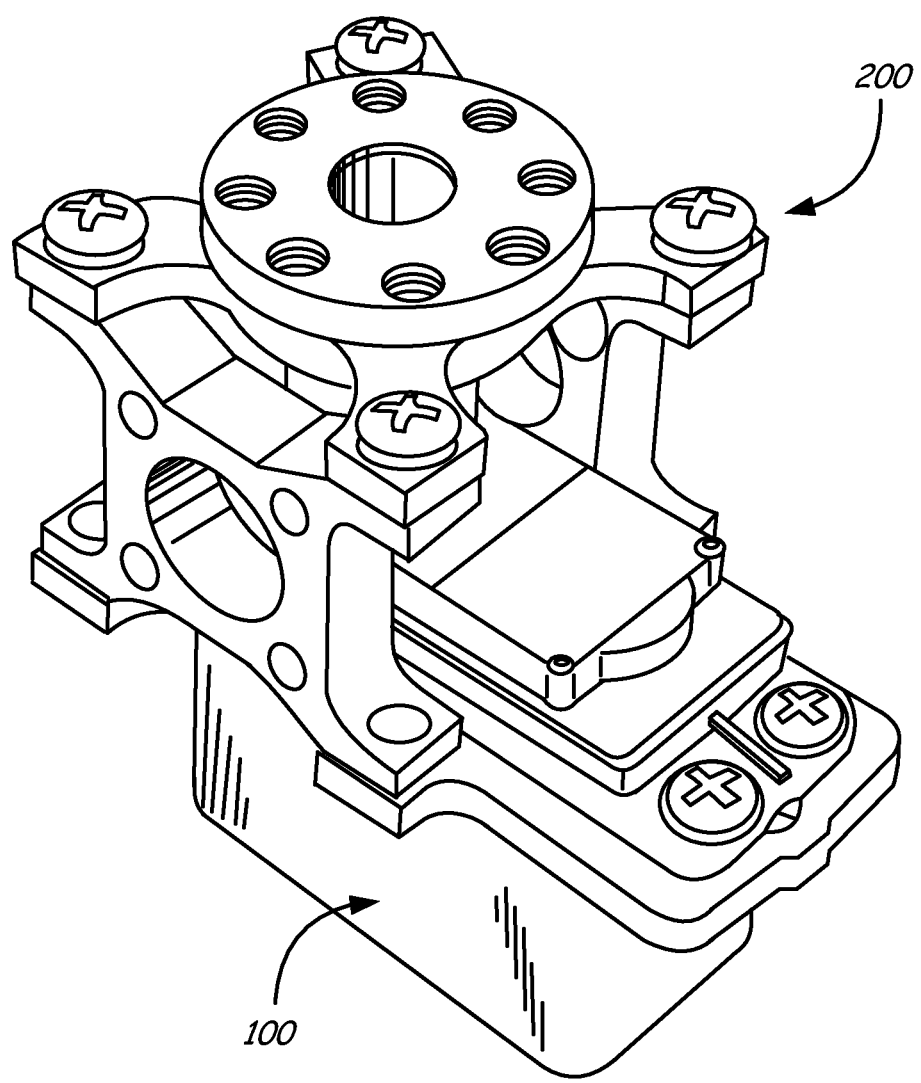
FIG. 2 is a perspective view of a servo block functionally coupled to a hobby servo motor.

FIG. 2 is a perspective view of a servo block 200 functionally coupled to a hobby servo motor 100. Servo block 200 increases a servo's load-bearing capabilities by helping to isolate the lateral load from the servo spline and case. The extreme versatility of servo blocks allow users to create complex, extremely rigid, structures with ease using standard hobby servos (e.g. Hitec servos). In an embodiment, the ½" aluminum hub shaft provides multiple mounting options using 6-32 screws. Additionally, the block 200 is optionally made of robust 6061 T-6 aluminum framework acts as a servo exoskeleton, greatly enhancing the mechanical loads the servo can withstand. A 0.770" hub pattern may be repeated throughout the framework to allow endless attachment options. Compatible with all standard size servos (e.g. Hitec). Block 200 works with robotics, animation, pan & tilt, and just about any project requiring servo power.

Figure 3:
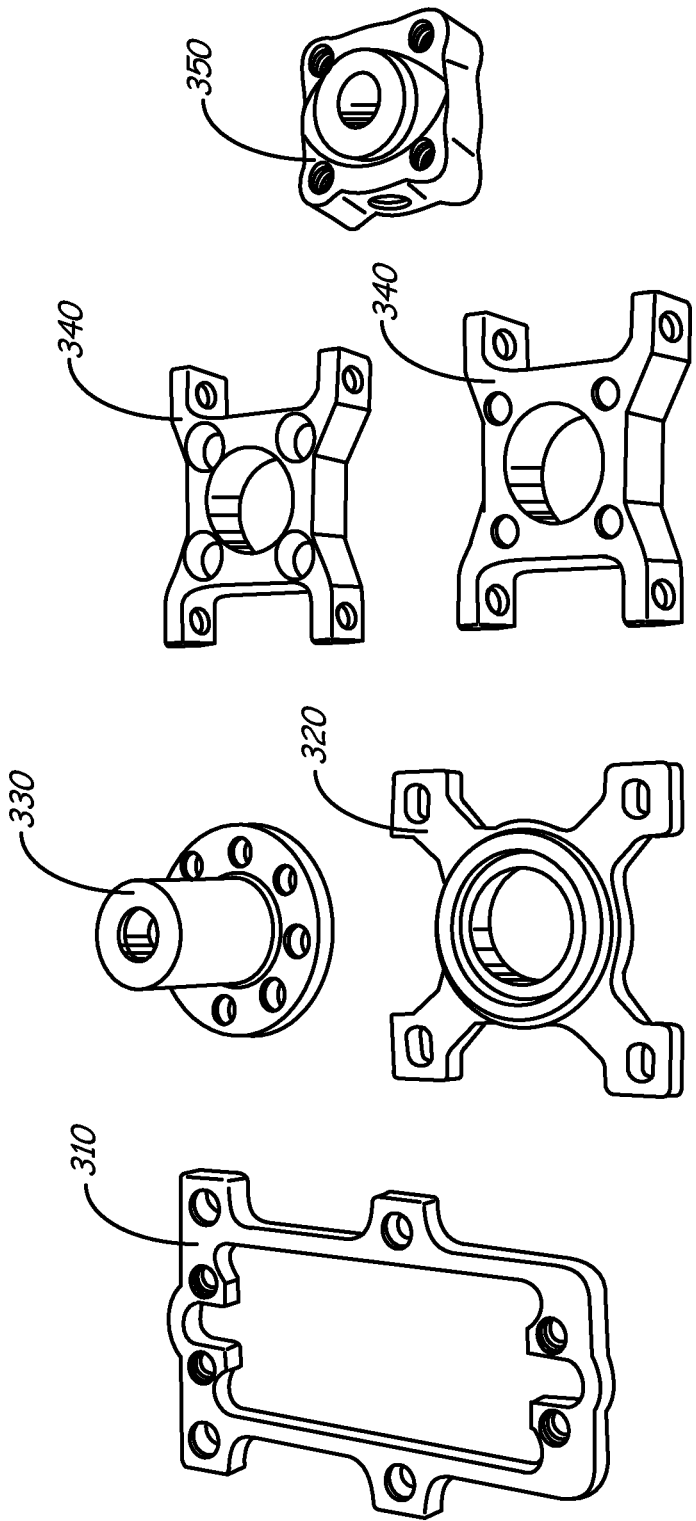
FIG. 3 is a perspective view of components that are optionally used to construct a servo block.

FIG. 3 shows some components that are optionally used to construct a servo block. The components include a servo plate 310, a ball bearing plate 320, a servo spline shaft hub 330, two hub plates 340, and a tube clamping hub 350 (e.g. a 0.770" 6-32 screws tube clamping hub). Embodiments of the present disclosure include any one or more of the components shown in the figure. Additionally, it should be noted that any of the components of a servo block can optionally be made integrated with other parts. For example, any two or more of the components can be made by one integrated component instead of multiple individual components. Additionally, any of the components could be made from more separate components. For example, shaft hub 330 could be made from two or more individual pieces instead of one integrated piece. Accordingly, embodiments are not limited to the specific examples shown in the figures, but instead can include any one or more features and/or combinations of features described in this application.

Figures 1, 4:
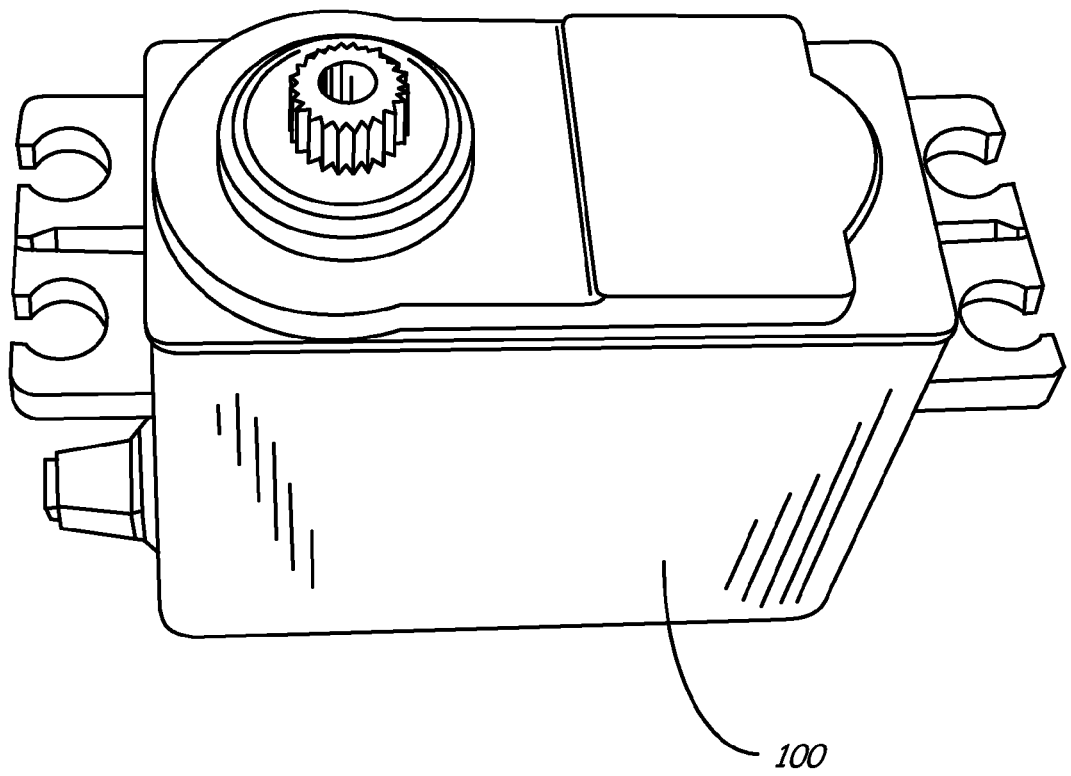
Figures 2, 4:
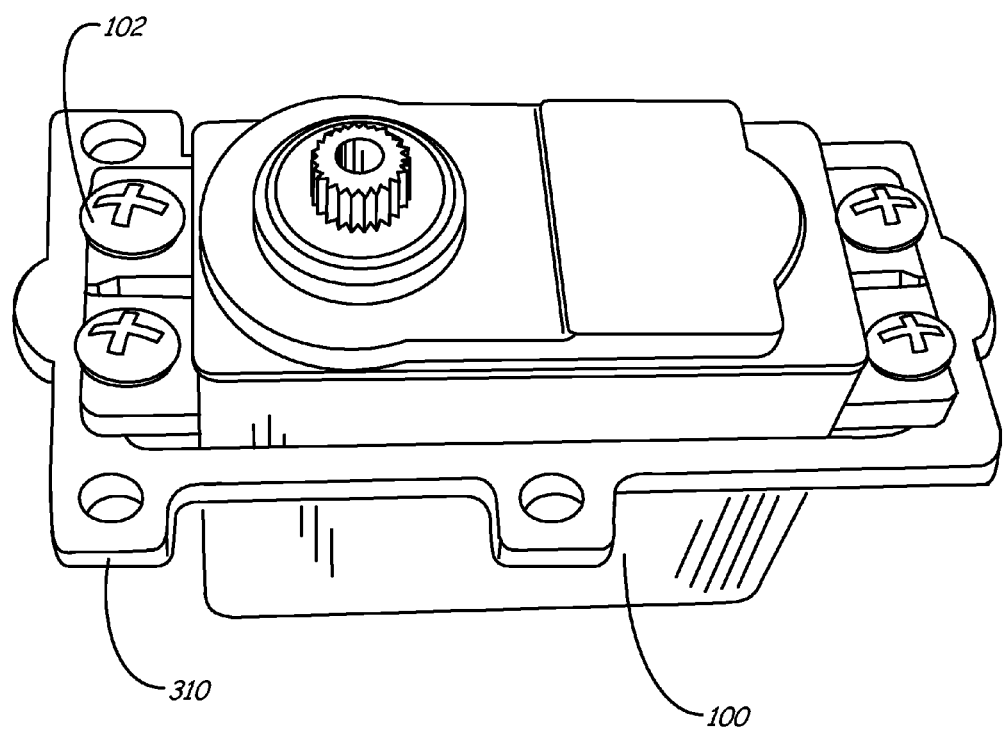
Figures 3, 4:
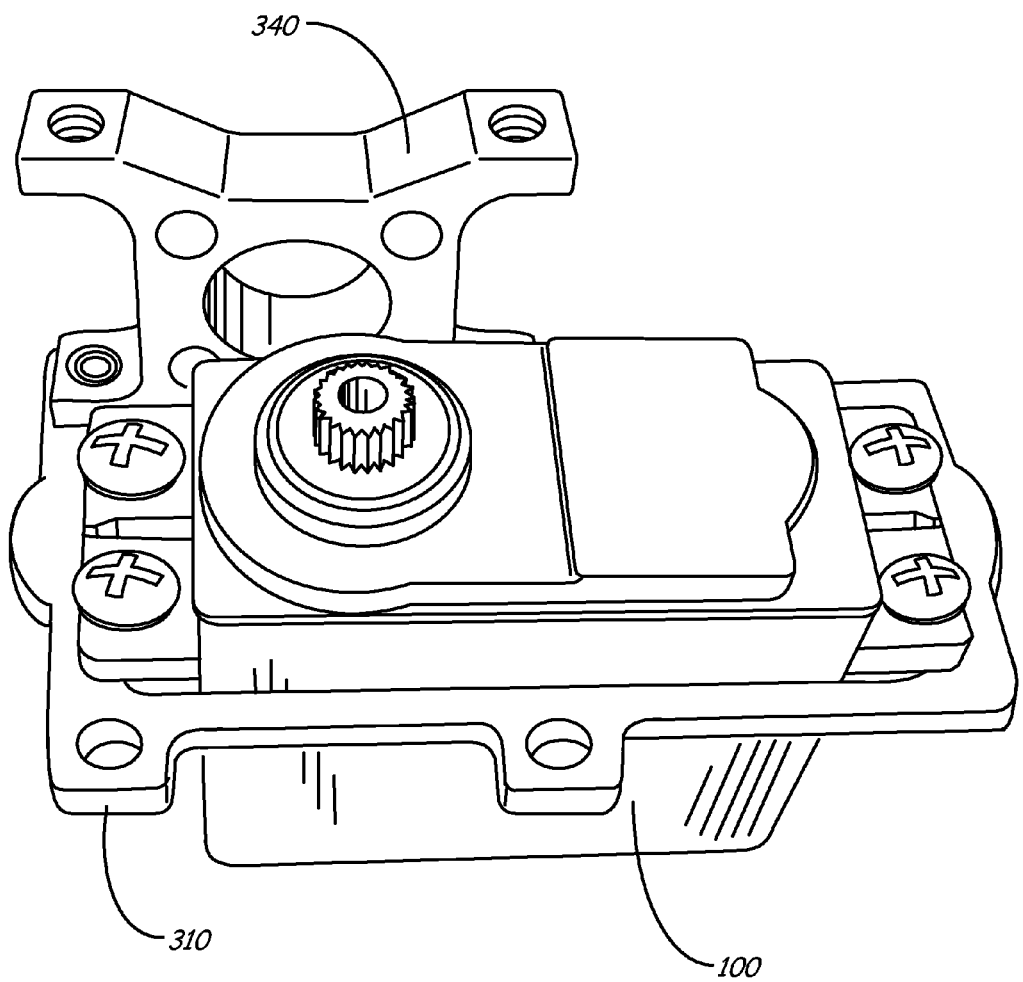
Figure 4:
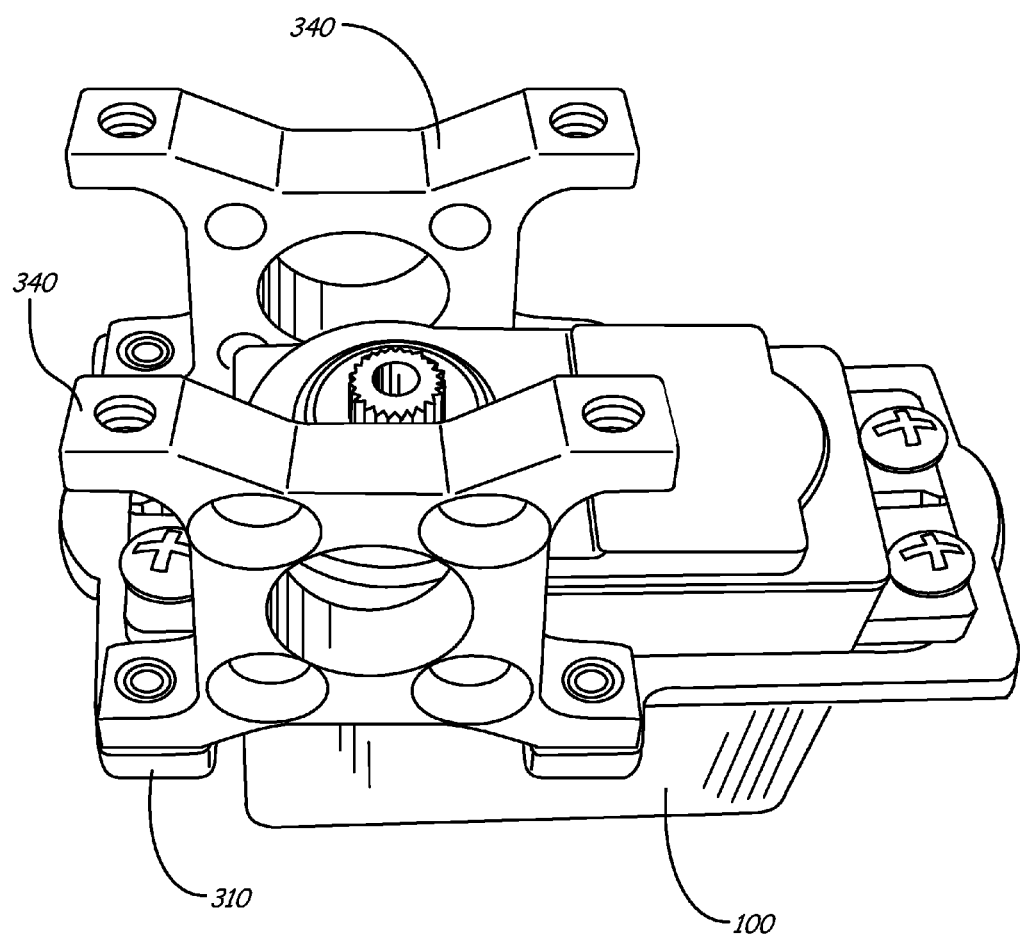
Figures 4, 5:
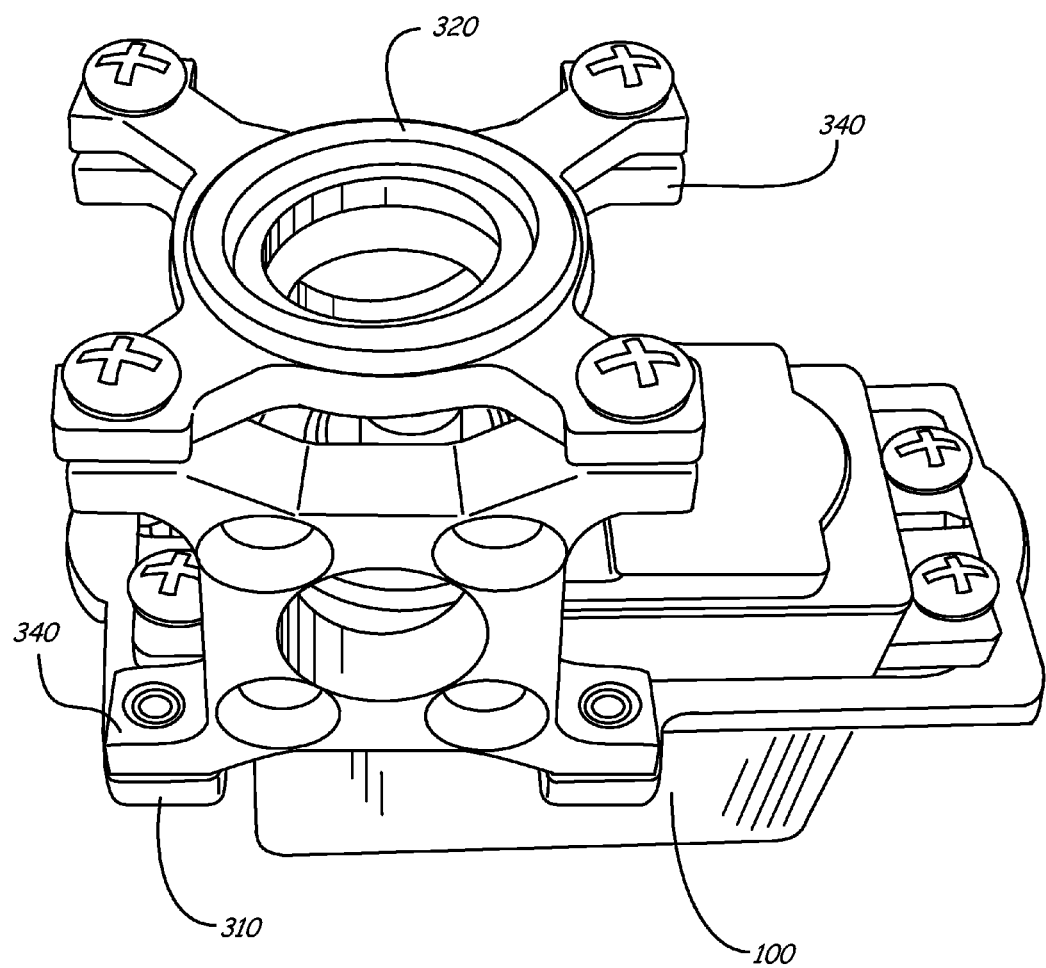
Figures 4, 5, 6:
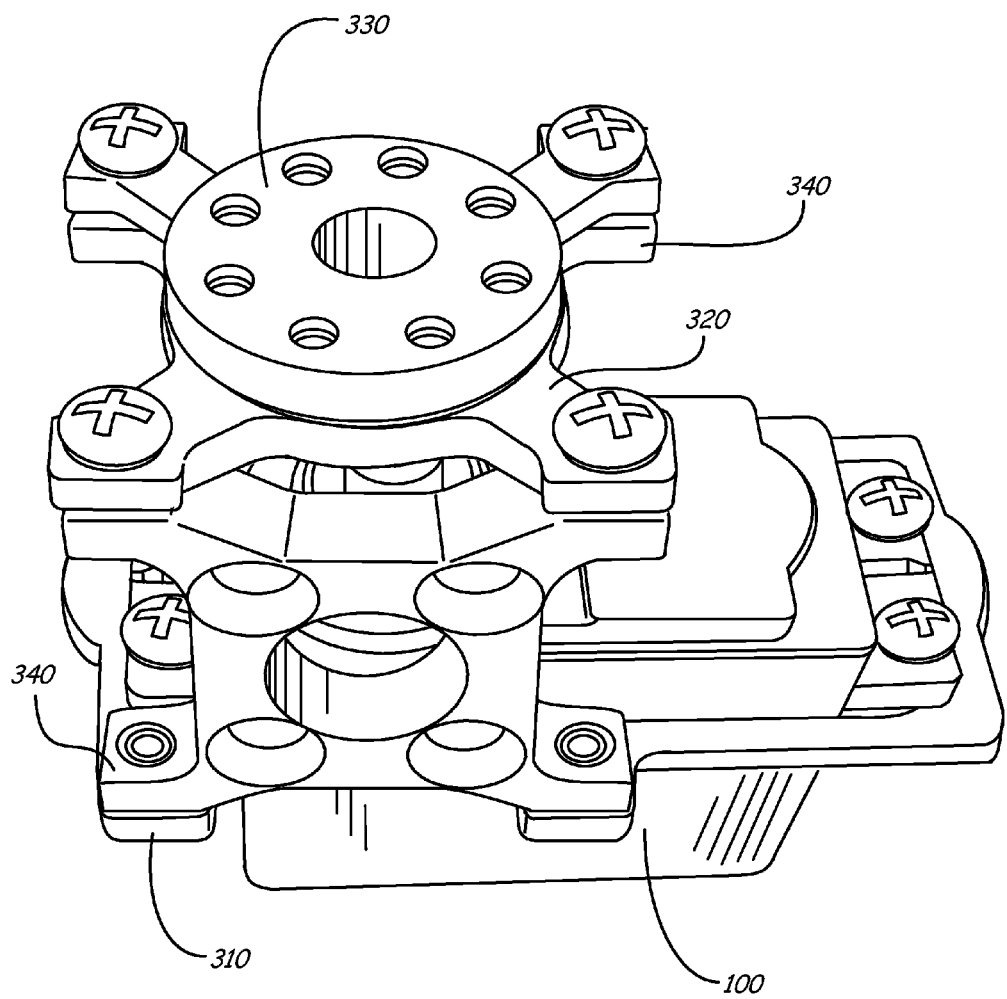

FIGS. 4-1 through 4-7 illustrate some possible steps for assembling and attaching a servo block to a hobby servo motor. FIG. 4-1 shows a hobby servo motor 100 by itself. In FIG. 4-2, a servo plate 310 is attached to motor 100 utilizing screws 102. In FIG. 4-3, a first one of the hub plates 340 is attached to the servo plate 310. In FIG. 4-4, a second one of the hub plates 340 is attached to the servo plate 310. In FIG. 4-5, a ball bearing plate 320 is attached to the two hub plates 340. In FIG. 4-6, a spline shaft hub 330 is attached to the ball bearing plate 320. In one embodiment, hub 340 includes a spline shaft receiving portion that functionally engages (e.g. receives) the splined output shaft of hobby servo motor 100 such that rotation of the output shaft is translated to hub 340. In FIG. 4-7, an optional tube clamping hub 350 is attached to one of the hub plates 340. Hub 350 can be used for example to attach a piece of tubing to the block.

FIG. 5 is a view of one embodiment of a servo plate 310. Plate 310 illustratively includes four apertures 502 for attaching (e.g. screwing) the plate to a servo motor, and four apertures 504 for attaching (e.g. screwing) hub plates 340 (shown and labeled in FIG. 3) to plate 310. Plate 310 also includes an inner diameter 506 and an aperture 508 that are configured to accommodate a hobby servo motor (i.e. diameter 506 is a little larger than an outer diameter of a hobby servo motor).

FIG. 6-1 is a top view of a ball bearing plate 320, and FIG. 6-2 is a view of the bottom of ball bearing plate 320. Plate 320 illustratively includes apertures 602 for attaching (e.g. screwing) plate 320 to hub plates 340 (shown and labeled in FIG. 3). Plate 320 also optionally includes an aperture 604 for fitting a shaft of a spline shaft hub 330. Furthermore, plate 320 includes a ball bearing assembly 606 for enabling hub 330 to rotate.

Figures 4, 5, 6, 7:
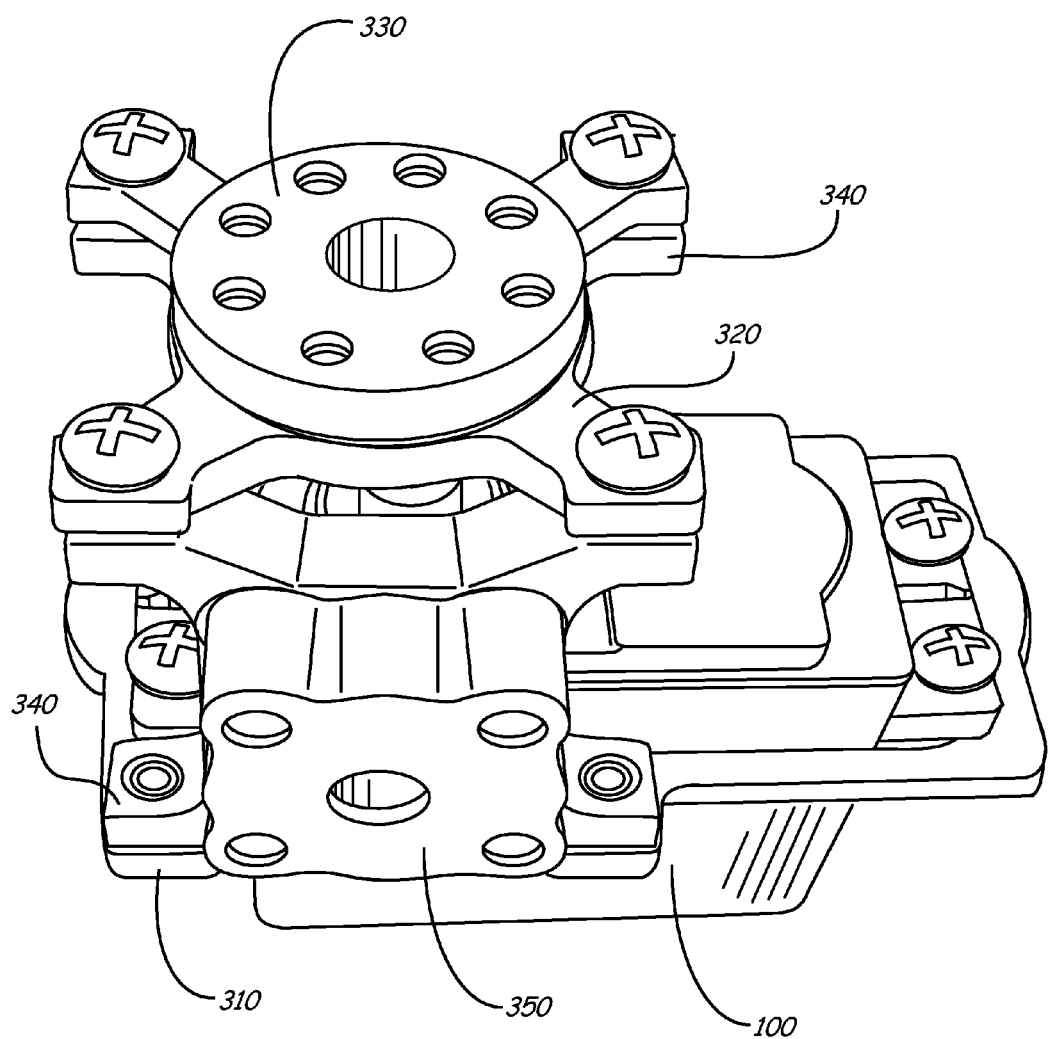
Figure 5:
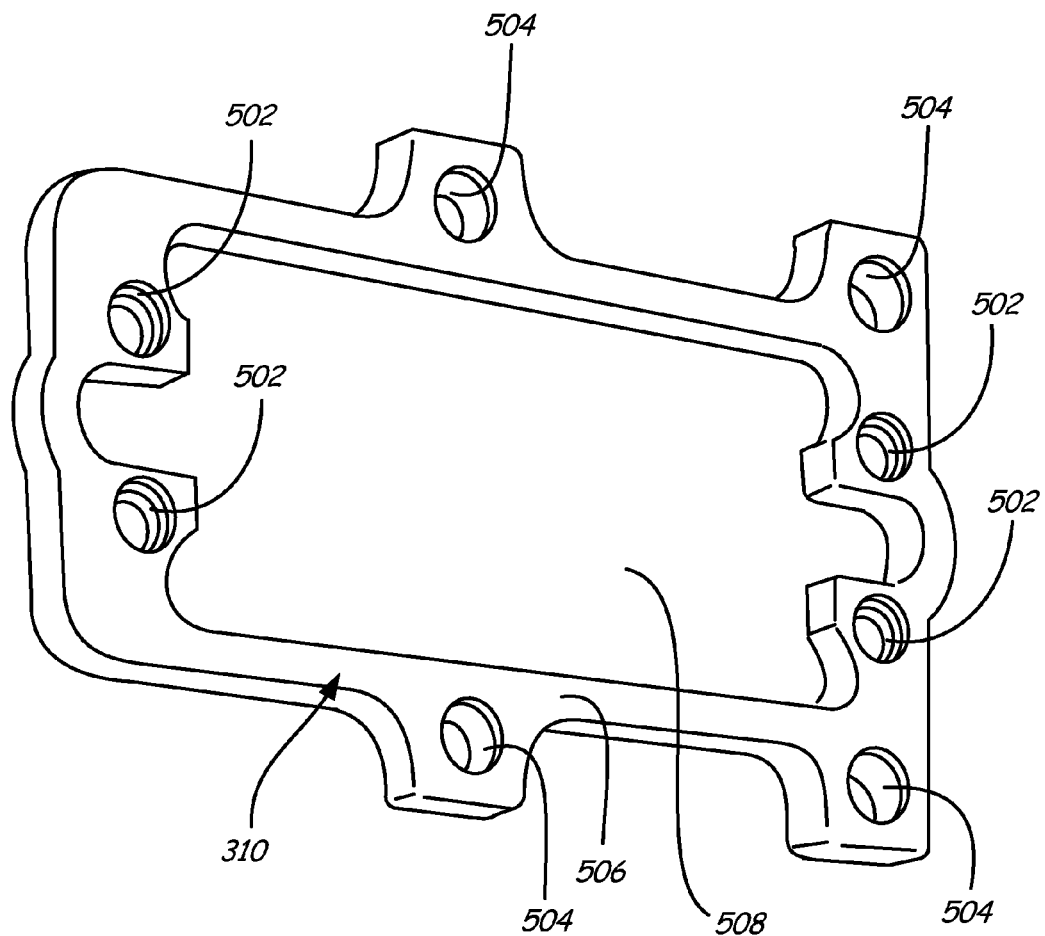
Figures 1, 6:
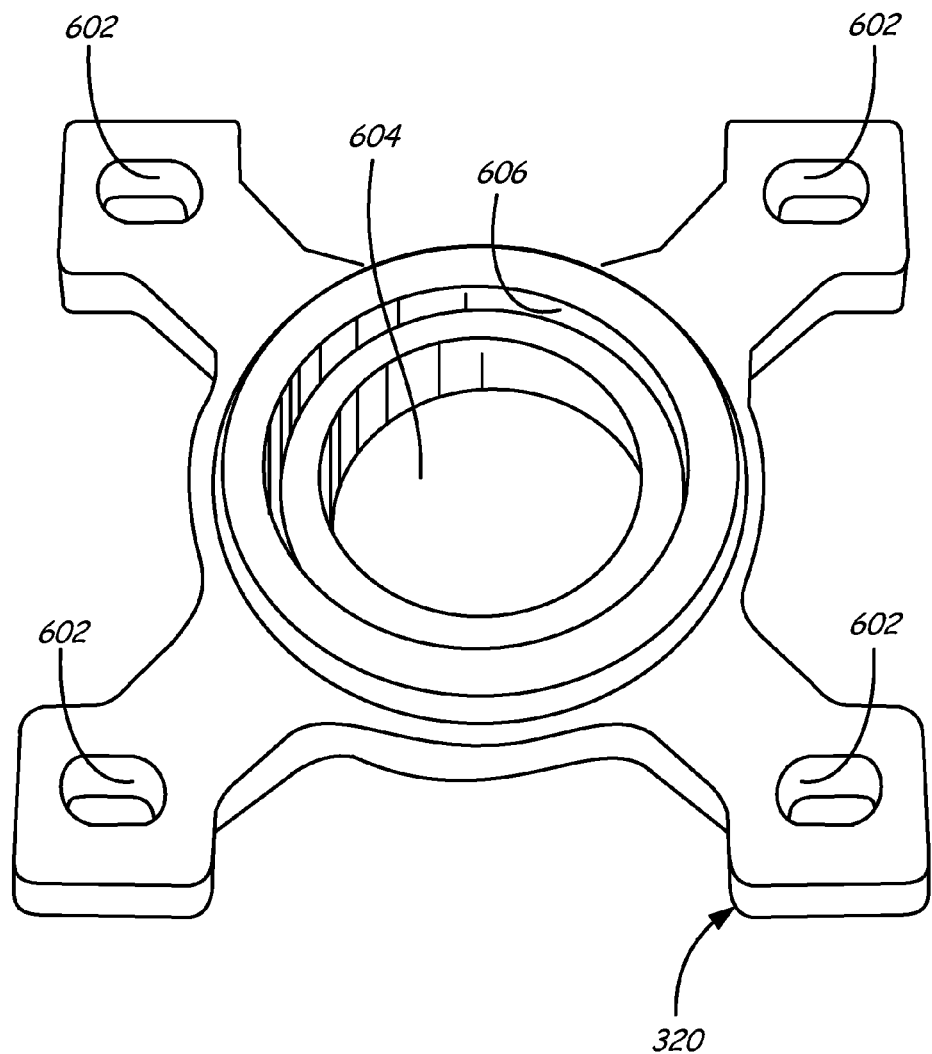
Figures 2, 6:
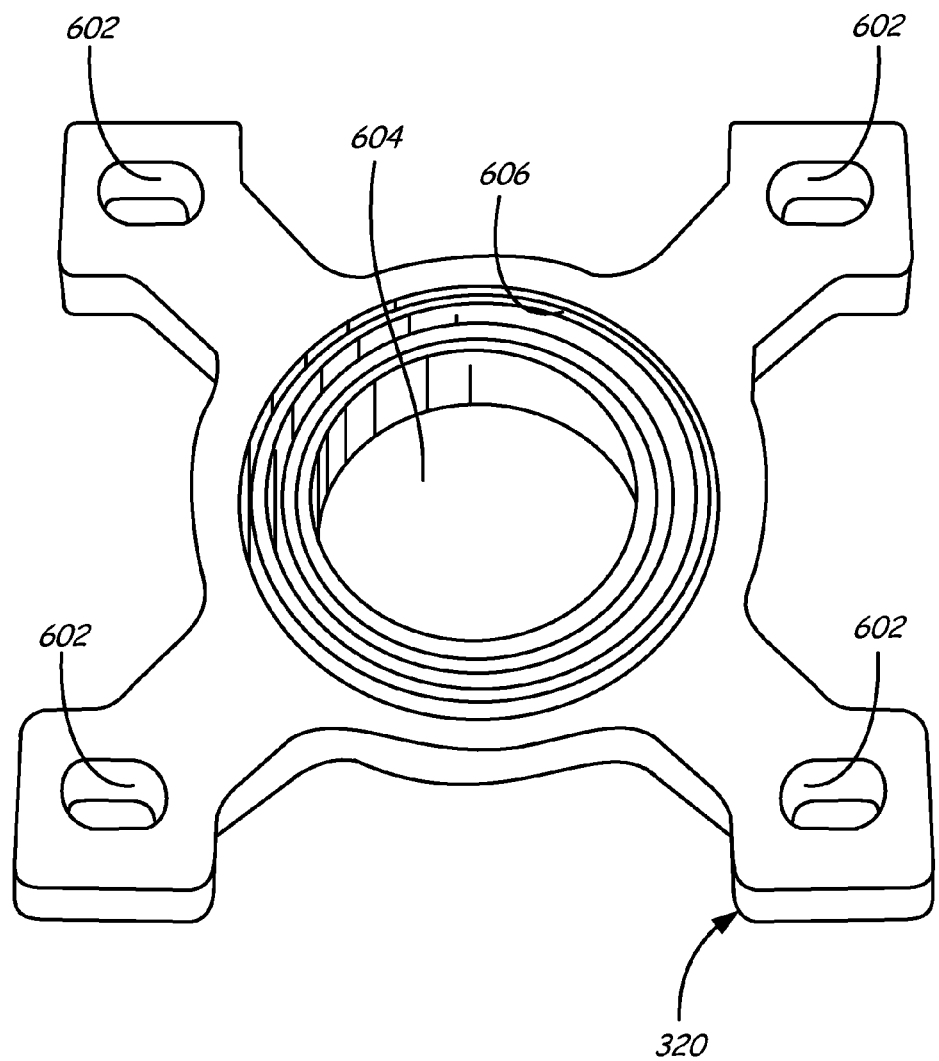
Figures 1, 7:
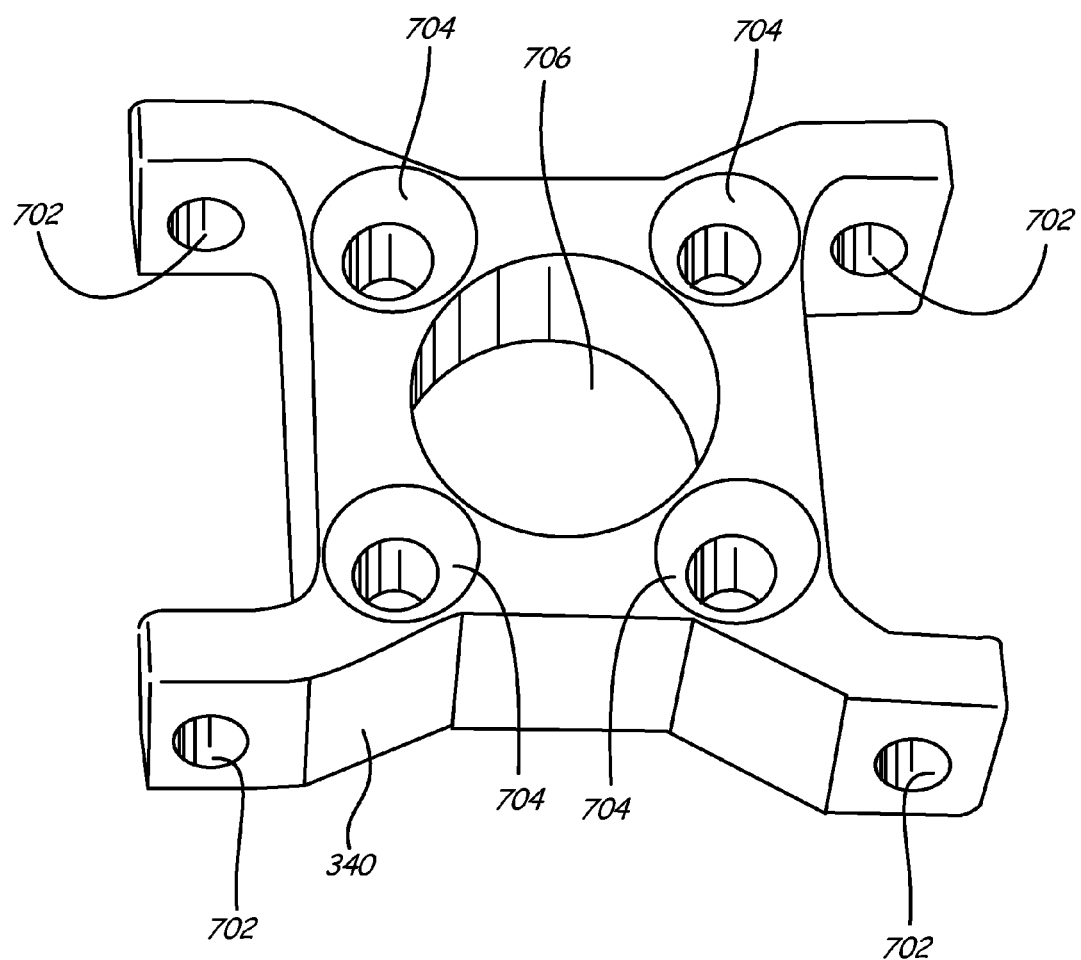
Figures 2, 7:
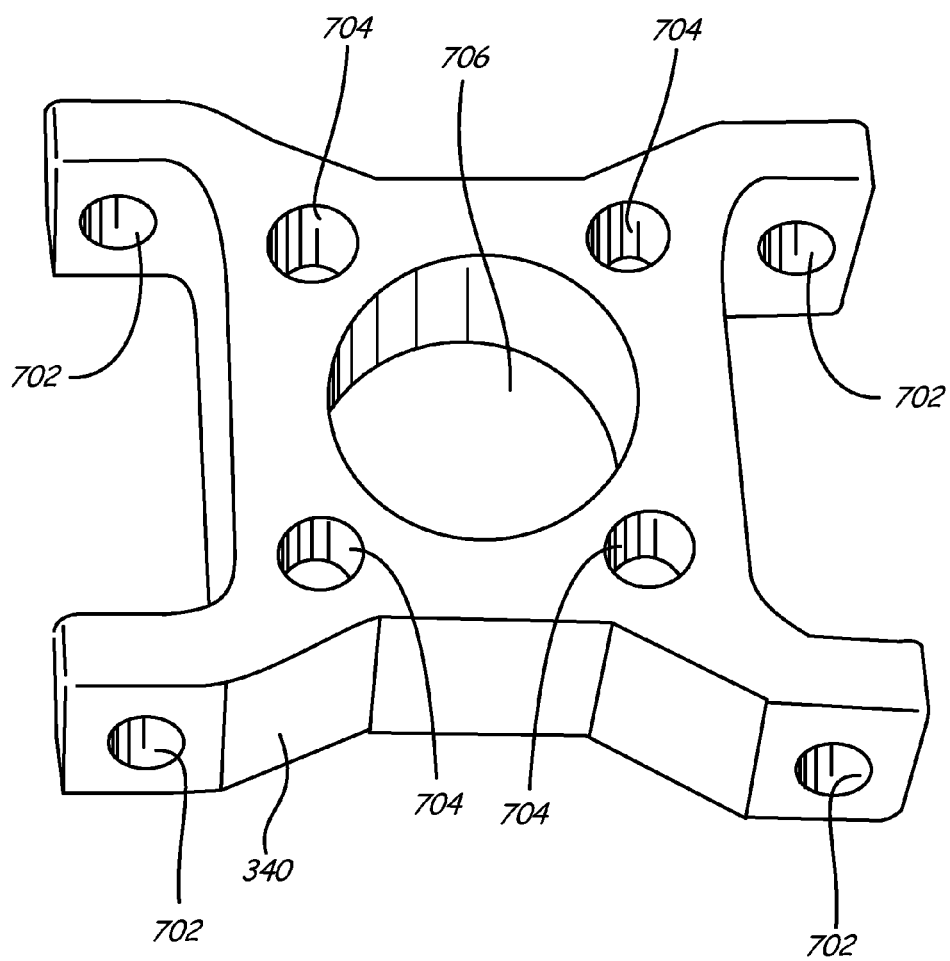

FIG. 7-1 is a top view of a hub plate 340, and FIG. 7-2 is a bottom view of hub plate 340. Plate 340 illustratively includes apertures 702 for attaching (e.g. screwing) plate 340 to both a servo plate 310 and to a ball bearing plate 320. Plate 340 also optionally includes a large aperture 706 and smaller apertures 704 that can be used to further attach other components to a block. For example, apertures 704 and 706 can be used to attach a tube clamp 350 (shown and labeled in FIG. 3) to the block.

Figures 1, 8:
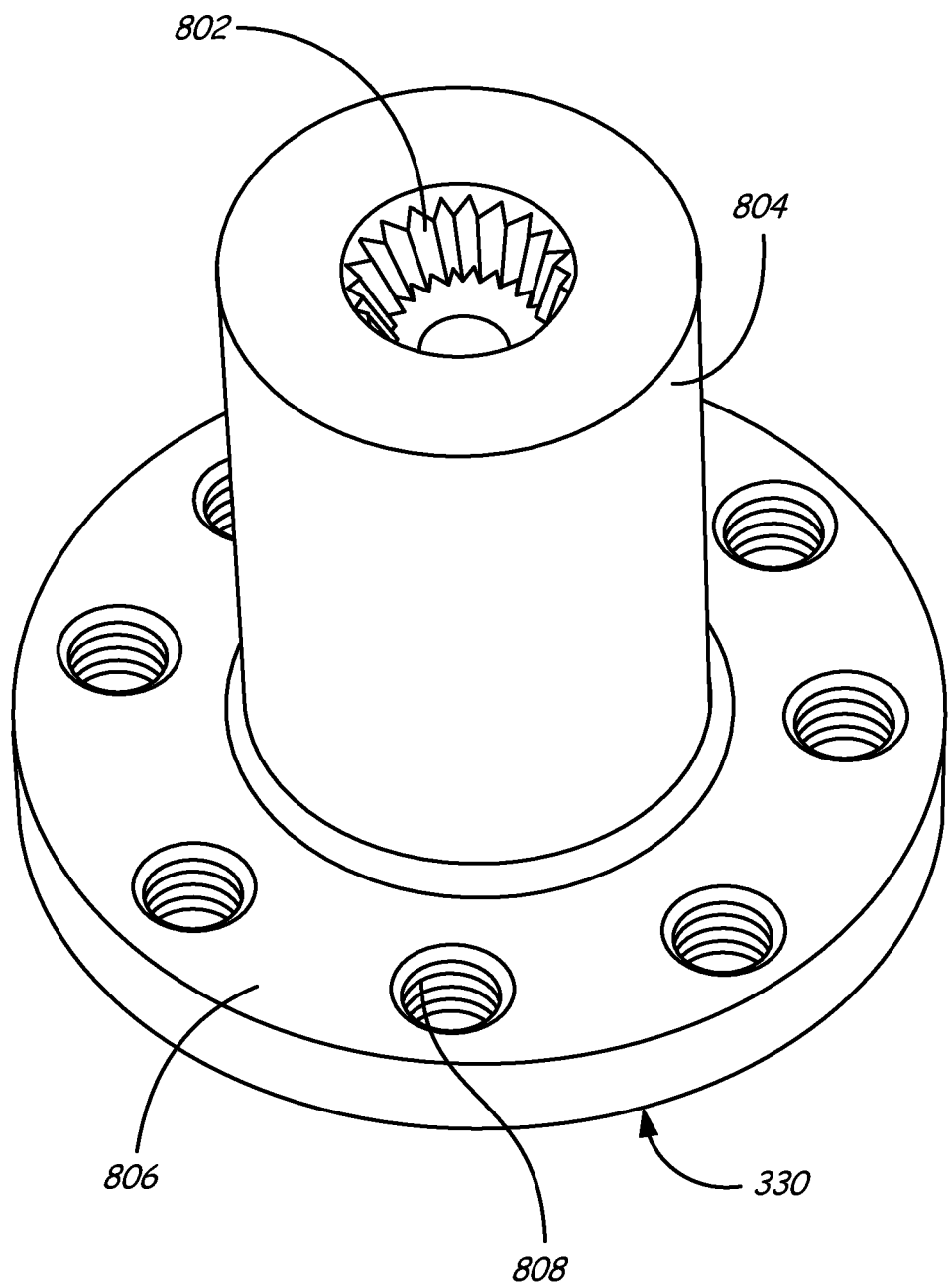
Figures 2, 8:
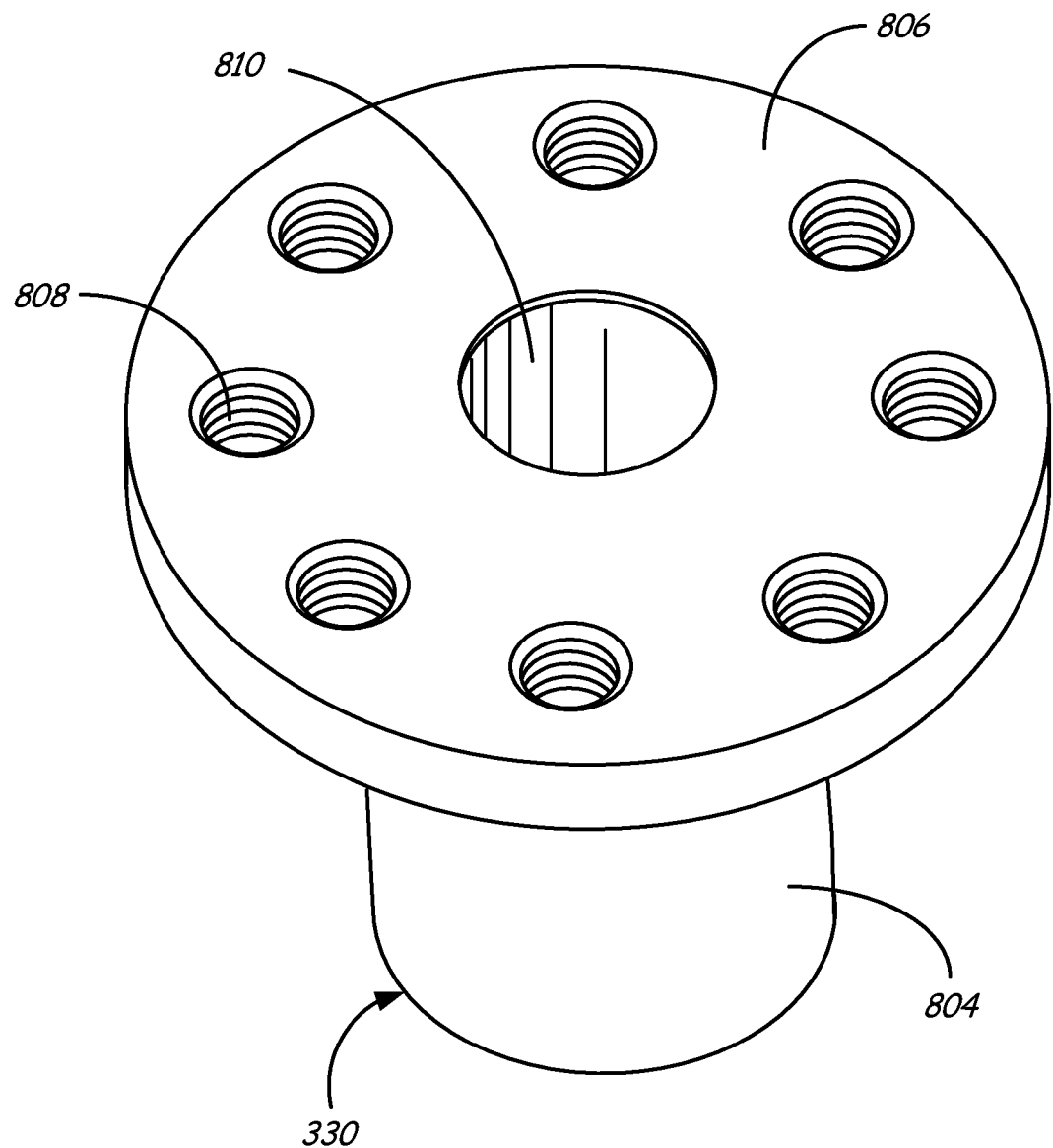

FIG. 8-1 is a top view of a servo spline shaft hub 330, and FIG. 8-2 is a bottom view of a servo spline shaft hub 330. Hub 330 illustratively includes a spline receiving aperture 802 that is configured to receive and functionally engage with a splined output shaft of a hobby servo motor. For example, aperture 802 receives a output shaft such that rotation of the output shaft is translated to hub 330. Hub 330 further includes a shaft 804 that in one embodiment has a circular outer surface. Hub 330 also optionally includes a bottom portion/flange 806 and apertures 808 that can be used to attach other components to the block. Hub 330 additionally may have an aperture 810 shown in FIG. 8-2 that could enable for instance a screw to be used to attach the hub 330 to a output shaft (e.g. by using a screw). Additionally, it should be noted that in another embodiment that a more or less straight shaft without a hub portion is used in pace of hub 330. The shaft portion similarly includes features (e.g. aperture 802) for attaching to a hobby servo motor. The main difference is that it does not include a flange portion 806, and is instead approximately cylindrical in shape.

Figures 1, 9:
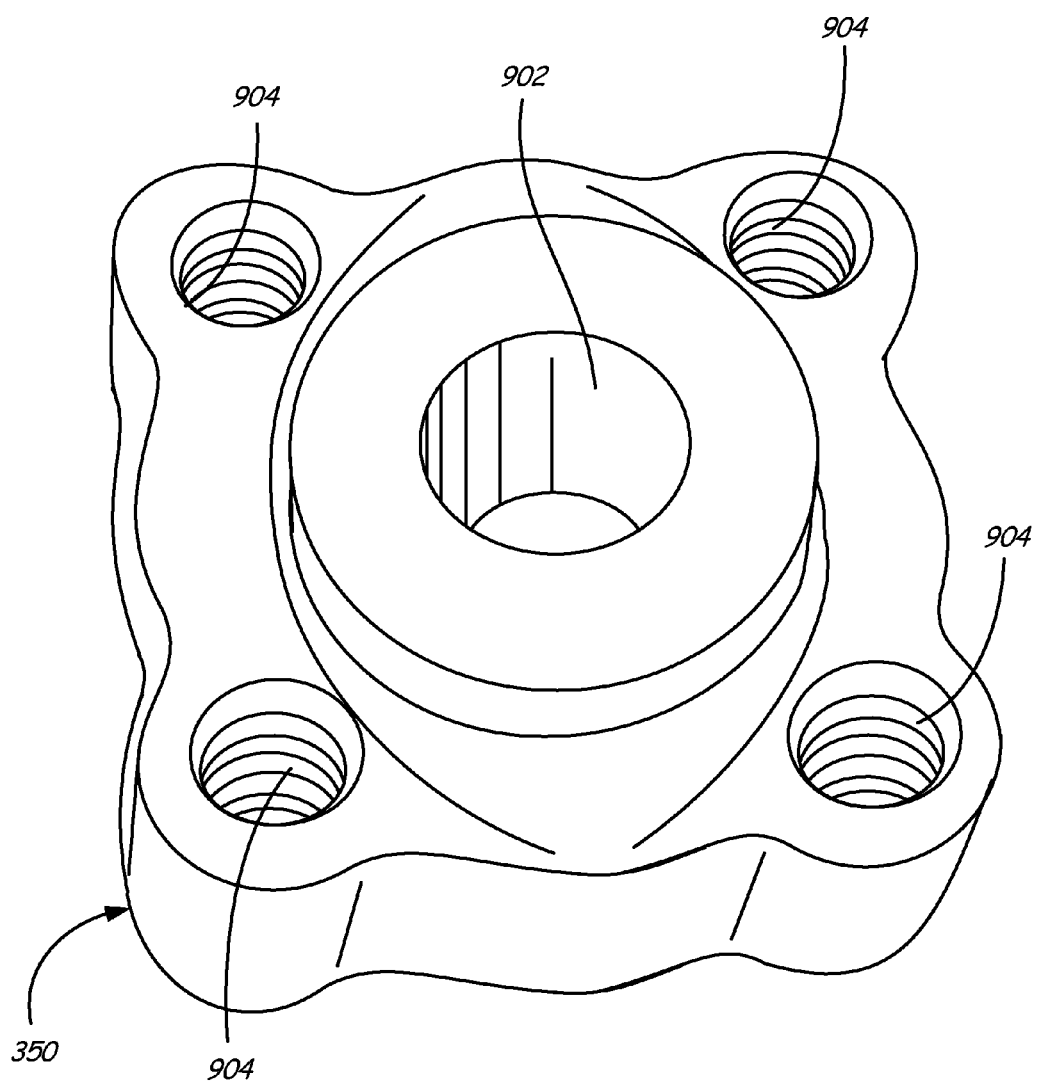
Figures 2, 9:
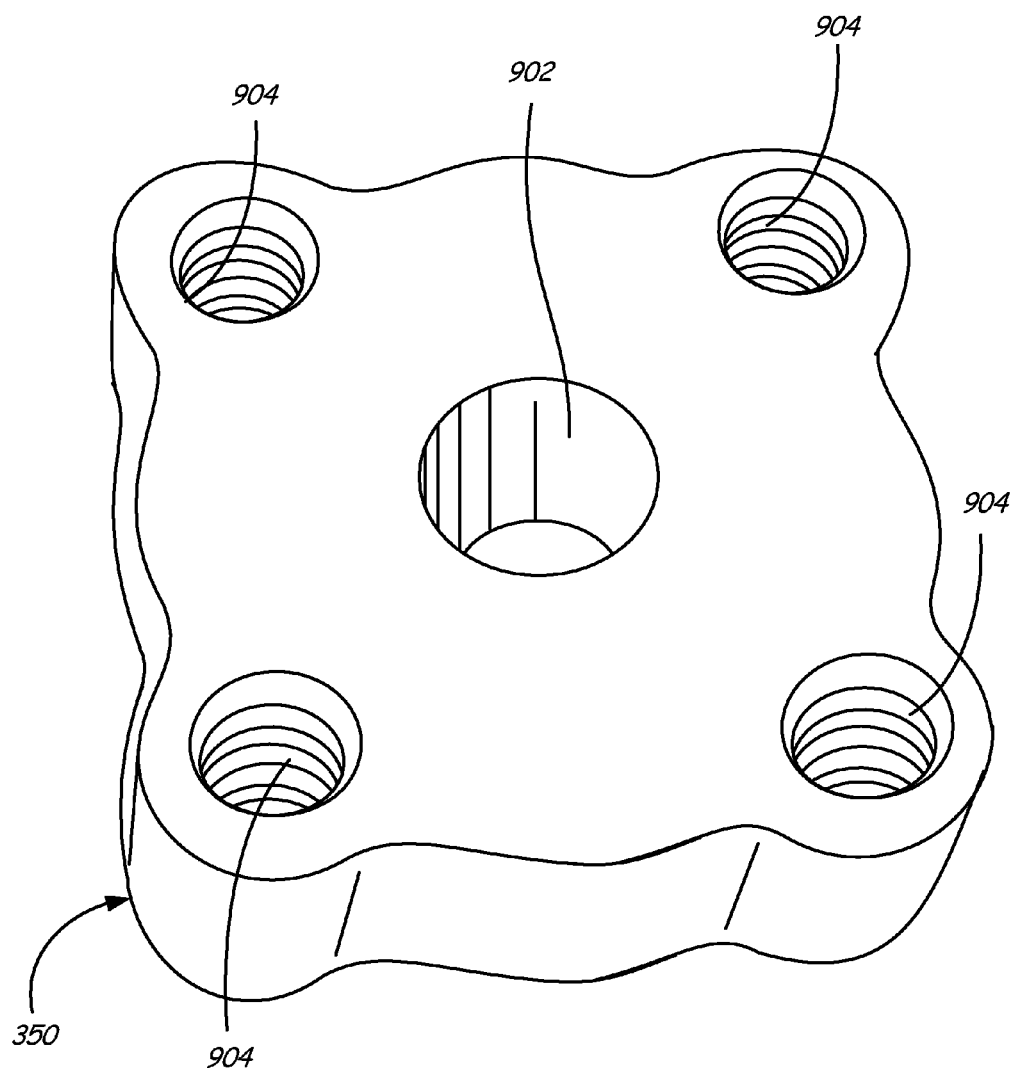

FIG. 9-1 is a top view of a tube clamping hub 350, and FIG. 9-2 is a bottom view of a tube clamping hub 350. Hub 350 could be used for example to attach another component to a block (e.g. attaching a tube to a block). Block 350 illustratively includes a larger aperture 902 (e.g. for receiving a tube), and smaller apertures 904 that could be used to attach the hub 350 to the block or for attaching other components to hub 350.

FIG. 10 illustrates some exemplary dimensions for some components of a block 200. Embodiments are not however limited to any particular dimensions, and embodiments include any dimensions. Additionally, in one embodiment, block 200 is made of a metal, such as but not limited to aluminum. Embodiments are not however limited to any particular material and block 200 can be made of other materials such as a synthetic material (e.g. plastic), etc. Furthermore, in one embodiment, block 200 includes 6-32×¼" Pan Head Phillips Screws, and are designed for standard size Hitec and Futaba servos.

In one embodiment, a hobby servo block comprises a servo portion that is configured to receive a hobby servo motor, a ball bearing portion that is configured to support a ball bearing assembly, and an extension portion that is configured to functionally connect the servo and the ball bearing portions. The hobby servo block may further comprise a shaft portion that is configured to functionally engage an output shaft of the hobby servo motor, and that is configured to be rotated in an aperture of the ball bearing portion. The servo, the ball bearing, the extension, and the shaft portions may be formed as one integrated component. Alternatively, the servo, the ball bearing, the extension, and the shaft portions are formed as separate components. The hobby servo block may also include one or more additional extension portions that are configured to functionally connect the servo and the ball bearing portions.

The servo portion illustratively has an approximately rectangular shape that includes an inner perimeter that is larger than an outer perimeter of the hobby servo motor, and wherein the servo portion has a main body portion that includes a number of different types of apertures, a first group of the apertures being configured to attached the servo portion to the hobby servo motor, and a second group of the apertures being configured to attach the servo portion to the extension portion. A portion of the first group of apertures are located at approximately a center of the servo portion, wherein another portion of the first group of apertures are located at approximately an end of the servo portion, and wherein at least some of the second group of apertures are located at opposite ends of the servo portion. The ball bearing portion may include a central aperture that is configured to receive a rotatable shaft, wherein an inner surface of the central aperture is rotatable relative to a main body of the ball bearing portion, the main body including a number of support bars that extend outward from the central aperture, each of the support bars including an aperture that is configured to attach the ball bearing portion to the extension portion, and wherein the ball bearing portion has an approximately cross shape appearance.

The extension portion may include a main body having a central aperture that is surrounded by smaller satellite apertures, the main body including a number of support bars that extend outward from a central portion of the main body, each of the support bars including an aperture that is configured to attach the ball bearing portion to the hobby servo motor, wherein the apertures in the support bar at least approximately perpendicular to the smaller satellite apertures and the central aperture, and wherein the extension portion has an approximately H-shape appearance. Furthermore, the hobby servo block may include a shaft portion that includes a cylindrical main body portion, one end of the main body portion including an aperture that is configured to receive and to functionally engage a rotatable output shaft of the hobby servo motor, an outer surface of the main body portion being at least approximately smooth, a second end of the main body portion including a flange portion that extends outward from the cylindrical main body portion, the flange portion being at least approximately cylindrical and having a set of satellite apertures surround a central aperture, the set of satellite apertures being configured to attach the shaft portion to other components, the central aperture being configured to secure the shaft portion to the hobby servo motor utilizing a screw, and wherein the central aperture is a same size or larger than the satellite apertures.

The hobby servo block may also comprise a second extension portion, wherein the two extension portions are at least approximately parallel to each other, wherein the servo portion and the ball bearing portion are at least approximately parallel to each other, and wherein the two extension portions are at least approximately perpendicular to the servo and the ball bearing portions.

In another embodiment, a hobby servo block illustratively includes a hobby servo portion, a ball bearing portion that is at least approximately parallel to the hobby servo portion, at least two extension portions that are at least approximately parallel to the ball bearing portion, and that connect the hobby servo and the ball bearing portion, and a shaft portion that is configured to functionally engage a rotatable shaft of a hobby servo motor, and to fit through a central aperture in the ball bearing portion. The hobby servo block may include a hobby servo motor that fits through a central aperture in the hobby servo portion, and that has a splined output shaft that has an angular position that is controlled at least in part by a coded input signal on an input line. The hobby servo motor may be modified to remove an internal potentiometer from a control loop of the hobby servo motor, wherein the internal potentiometer has been replaced in the control loop with an external potentiometer, and wherein hobby servo motor control scheme is configured to utilize the external potentiometer to provide proportional control over a range greater than three hundred and sixty angular degrees.

The ball bearing portion optionally includes a ball bearing assembly that is rotatable relative to an outer stationary portion, and the shaft portion optionally includes a first end that is configured to functionally engage a splined output shaft of the hobby servo motor, and a second end that is configured to secure the hobby servo block to another component utilizing a flange with apertures.

In yet another embodiment, an apparatus comprises a first portion that is configured to attach the apparatus to a hobby servo motor, a rotatable shaft that is configured to be functionally engaged to a splined output shaft of the hobby servo motor, and a second portion that is configured to be attached to the first portion and that has an aperture that is configured to receive and support the rotatable shaft to increase a load bearing capacity of the hobby servo motor. The first portion and the second portion are at least approximately parallel. The first rotatable output shaft is at least approximately perpendicular to the first and the second portions, and multiple extension portions may connect the first and the second portions.

Finally, it is to be understood that even though numerous characteristics and advantages of various embodiments have been set forth in the foregoing description, together with details of the structure and function of various embodiments, this detailed description is illustrative only, and changes may be made in detail, especially in matters of structure and arrangements of parts within the principles of the present disclosure to the full extent indicated by the broad general meaning of the terms in which the appended claims are expressed. In addition, although the embodiments described herein are directed to hobby servo motors, it will be appreciated by those skilled in the art that the teachings of the disclosure can be applied to other types of devices, without departing from the scope and spirit of the disclosure.

What is claimed is:

1. A hobby servo block comprising:
    a servo portion that is configured to receive a hobby servo motor;
    a ball bearing portion that is configured to support a ball bearing assembly; and
    an extension portion that is configured to functionally connect the servo and the ball bearing portions; and
    wherein the ball bearing portion includes a central aperture that is configured to receive a rotatable shaft, wherein an inner surface of the central aperture is rotatable relative to a main body of the ball bearing portion, the main body including a number of support bars that extend outward from the central aperture, each of the support bars including an aperture that is configured to attach the ball bearing portion to the extension portion, and wherein the ball bearing portion has an approximately cross shape appearance.

2. The hobby servo block of claim 1, and further comprising:
    a shaft portion that is configured to functionally engage an output shaft of the hobby servo motor, and that is configured to be rotated in an aperture of the ball bearing portion.

3. The hobby servo block of claim 2, wherein the servo, the ball bearing, the extension, and the shaft portions are formed as one integrated component.

4. The hobby servo block of claim 2, wherein the servo, the ball bearing, the extension, and the shaft portions are formed as separate components.

5. The hobby servo block of claim 1, and further comprising:
    one or more additional extension portions that are configured to functionally connect the servo and the ball bearing portions.

6. The hobby servo block of claim 1, wherein the servo portion has an approximately rectangular shape that includes an inner perimeter that is larger than an outer perimeter of the hobby servo motor, and wherein the servo portion has a main body portion that includes a number of different types of apertures, a first group of the apertures being configured to attached the servo portion to the hobby servo motor, and a second group of the apertures being configured to attach the servo portion to the extension portion.

7. The hobby servo block of claim 6, wherein a portion of the first group of apertures are located at approximately a center of the servo portion, wherein another portion of the first group of apertures are located at approximately an end of the servo portion, and wherein at least some of the second group of apertures are located at opposite ends of the servo portion.

8. The hobby servo block of claim 1, and further comprising a second extension portion, wherein the two extension portions are at least approximately parallel to each other, wherein the servo portion and the ball bearing portion are at least approximately parallel to each other, and wherein the two extension portions are at least approximately perpendicular to the servo and the ball bearing portions.

9. A hobby servo block comprising:
   a servo portion that is configured to receive a hobby servo motor;
   a ball bearing portion that is configured to support a ball bearing assembly;
   an extension portion that is configured to functionally connect the servo and the ball bearing portions; and
   wherein the extension portion includes a main body having a central aperture that is surrounded by smaller satellite apertures, the main body including a number of support bars that extend outward from a central portion of the main body, each of the support bars including an aperture that is configured to attach the ball bearing portion to the hobby servo motor, wherein the apertures in the support bar at least approximately perpendicular to the smaller satellite apertures and the central aperture, and wherein the extension portion has an approximately H-shape appearance.

10. The hobby servo block of claim 9, and further comprising:
    a shaft portion that is configured to functionally engage an output shaft of the hobby servo motor, and that is configured to be rotated in an aperture of the ball bearing portion.

11. The hobby servo block of claim 10, wherein the servo, the ball bearing, the extension, and the shaft portions are formed as one integrated component.

12. The hobby servo block of claim 10, wherein the servo, the ball bearing, the extension, and the shaft portions are formed as separate components.

13. The hobby servo block of claim 9, and further comprising:
    one or more additional extension portions that are configured to functionally connect the servo and the ball bearing portions.

14. The hobby servo block of claim 9, wherein the servo portion has an approximately rectangular shape that includes an inner perimeter that is larger than an outer perimeter of the hobby servo motor, and wherein the servo portion has a main body portion that includes a number of different types of apertures, a first group of the apertures being configured to attached the servo portion to the hobby servo motor, and a second group of the apertures being configured to attach the servo portion to the extension portion, wherein a portion of the first group of apertures are located at approximately a center of the servo portion, wherein another portion of the first group of apertures are located at approximately an end of the servo portion, and wherein at least some of the second group of apertures are located at opposite ends of the servo portion.

15. A hobby servo block comprising:
    a servo portion that is configured to receive a hobby servo motor;
    a ball bearing portion that is configured to support a ball bearing assembly;
    an extension portion that is configured to functionally connect the servo and the ball bearing portions; and
    a shaft portion that includes a cylindrical main body portion, one end of the main body portion including an aperture that is configured to receive and to functionally engage a rotatable output shaft of the hobby servo motor, an outer surface of the main body portion being at least approximately smooth, a second end of the main body portion including a flange portion that extends outward from the cylindrical main body portion, the flange portion being at least approximately cylindrical and having a set of satellite apertures surround a central aperture, the set of satellite apertures being configured to attach the shaft portion to other components, the central aperture being configured to secure the shaft portion to the hobby servo motor utilizing a screw, and wherein the central aperture is a same size or larger than the satellite apertures.

16. The hobby servo block of claim 15, and further comprising:
    a shaft portion that is configured to functionally engage an output shaft of the hobby servo motor, and that is configured to be rotated in an aperture of the ball bearing portion.

17. The hobby servo block of claim 16, wherein the servo, the ball bearing, the extension, and the shaft portions are formed as one integrated component.

18. The hobby servo block of claim 16, wherein the servo, the ball bearing, the extension, and the shaft portions are formed as separate components.

19. The hobby servo block of claim 15, and further comprising:
    one or more additional extension portions that are configured to functionally connect the servo and the ball bearing portions.

20. The hobby servo block of claim 15, wherein the servo portion has an approximately rectangular shape that includes an inner perimeter that is larger than an outer perimeter of the hobby servo motor, and wherein the servo portion has a main body portion that includes a number of different types of apertures, a first group of the apertures being configured to attached the servo portion to the hobby servo motor, and a second group of the apertures being configured to attach the servo portion to the extension portion; wherein a portion of the first group of apertures are located at approximately a center of the servo portion, wherein another portion of the first group of apertures are located at approximately an end of the servo portion, and wherein at least some of the second group of apertures are located at opposite ends of the servo portion.

* * * * *